US008489691B2

(12) United States Patent
Blackburn et al.

(10) Patent No.: US 8,489,691 B2
(45) Date of Patent: Jul. 16, 2013

(54) COMMUNICATION SYSTEM AND METHOD

(75) Inventors: Helen Blackburn, London (GB); Mark McLaughlin, Surrey (GB); Rachel Eardley, Bristol (GB); Marek Laasik, Tallinn (EE); Madis Kaal, Tallinn (EE)

(73) Assignee: Microsoft Corporation, Redmond, WA (US)

( * ) Notice: Subject to any disclaimer, the term of this patent is extended or adjusted under 35 U.S.C. 154(b) by 69 days.

(21) Appl. No.: 12/455,653

(22) Filed: Jun. 4, 2009

(65) Prior Publication Data
US 2010/0060788 A1 Mar. 11, 2010

(30) Foreign Application Priority Data

Sep. 5, 2008 (GB) .................................. 0816275.2

(51) Int. Cl.
*G06F 15/16* (2006.01)
*G06F 3/048* (2006.01)
*H04N 5/445* (2011.01)

(52) U.S. Cl.
USPC ........................................................ 709/206

(58) Field of Classification Search
USPC ...... 709/203, 217, 206; 345/667; 379/399.01, 379/88.17; 715/92, 792; 348/563
See application file for complete search history.

(56) References Cited

U.S. PATENT DOCUMENTS 5,506,572 A 4/1996 Hills et al.
5,587,928 A 12/1996 Jones et al.

(Continued)

FOREIGN PATENT DOCUMENTS

DE 19971016486 A1 9/1998
DE 102006001607 8/2006

(Continued)

OTHER PUBLICATIONS

Search Report issued in related Great Britain application No. GB0816275.2, dated Nov. 23, 2009 (1 page).

(Continued)

*Primary Examiner* — Firmin Backer
*Assistant Examiner* — Michael A Chambers
(74) *Attorney, Agent, or Firm* — Wolfe-SBMC

(57) ABSTRACT

A method of initiating a communication event via a packet-based communication network in a media appliance having a processor executing a communication client, comprising: retrieving a stored list comprising a plurality of contacts associated with a user of the communication client; generating a first two-dimensional contact grid comprising a first arrangement of entries; displaying the first contact grid on a display means such that each of a plurality of the entries comprises a graphical representation of a respective one of the plurality of contacts, wherein the graphical representations are sized so as to fit in the entries of the first contact grid; receiving a selection of a subset of the graphical representations in the first contact grid from a user of the communication client; generating a second contact grid comprising a second arrangement of entries corresponding to the selected subset; displaying the second contact grid on the display means in replacement of the first contact grid, such that each of a plurality of the entries comprises a graphical representation of a respective one of the plurality of contacts, and wherein the graphical representations are resized so as to fit in the entries of the second contact grid; receiving a selection of one of the graphical representations in the second contact grid from the user of the communication client; and initiating a communication event with the contact represented by the selected graphical representation via the packet-based communication network.

22 Claims, 6 Drawing Sheets

U.S. PATENT DOCUMENTS

| Patent No. | | Date | Inventor | Ref. |
|---|---|---|---|---|
| 5,812,770 | A * | 9/1998 | Sakai | 709/245 |
| 5,856,821 | A * | 1/1999 | Funahashi | 345/667 |
| 5,923,737 | A * | 7/1999 | Weishut et al. | 379/93.17 |
| 6,061,434 | A | 5/2000 | Corbett | |
| 6,151,619 | A * | 11/2000 | Riddle | 709/204 |
| 6,209,025 | B1 * | 3/2001 | Bellamy | 709/217 |
| 6,243,129 | B1 | 6/2001 | Deierling | |
| 6,286,140 | B1 | 9/2001 | Ivanyi | |
| 6,628,964 | B1 | 9/2003 | Bates et al. | |
| 6,636,269 | B1 | 10/2003 | Baldwin | |
| 6,789,105 | B2 | 9/2004 | Ludwig et al. | |
| 6,930,661 | B2 | 8/2005 | Uchida et al. | |
| 7,058,901 | B1 * | 6/2006 | Hafey et al. | 715/792 |
| 7,099,693 | B2 | 8/2006 | Shin | |
| 7,184,049 | B2 | 2/2007 | Ballin et al. | |
| 7,454,711 | B2 * | 11/2008 | Angiulo et al. | 715/760 |
| 7,573,988 | B2 * | 8/2009 | Lee et al. | 379/88.17 |
| 7,587,684 | B2 * | 9/2009 | Perttula | 715/838 |
| 7,954,124 | B2 | 5/2011 | Rambo | |
| 7,966,039 | B2 | 6/2011 | Sadovsky et al. | |
| 7,983,722 | B2 | 7/2011 | Lowles et al. | |
| 8,407,749 | B2 | 3/2013 | McLaughlin et al. | |
| 8,413,199 | B2 | 4/2013 | Laasik et al. | |
| 8,421,839 | B2 | 4/2013 | Kert | |
| 2001/0005197 | A1 | 6/2001 | Mishra et al. | |
| 2002/0109770 | A1 * | 8/2002 | Terada | 348/14.08 |
| 2002/0144259 | A1 | 10/2002 | Gutta et al. | |
| 2002/0199181 | A1 | 12/2002 | Allen | |
| 2003/0009768 | A1 * | 1/2003 | Moir | 725/112 |
| 2003/0036683 | A1 * | 2/2003 | Kehr et al. | 600/300 |
| 2003/0052648 | A1 | 3/2003 | Hara et al. | |
| 2003/0061033 | A1 | 3/2003 | Dishert | |
| 2003/0070177 | A1 | 4/2003 | Kondo et al. | |
| 2003/0070182 | A1 | 4/2003 | Pierre et al. | |
| 2003/0097661 | A1 | 5/2003 | Li et al. | |
| 2003/0105812 | A1 * | 6/2003 | Flowers et al. | 709/203 |
| 2003/0117419 | A1 | 6/2003 | Hermanson | |
| 2003/0142802 | A1 | 7/2003 | Hong et al. | |
| 2004/0003025 | A1 * | 1/2004 | Hao | 709/201 |
| 2004/0049624 | A1 * | 3/2004 | Salmonsen | 710/306 |
| 2004/0060067 | A1 | 3/2004 | Yi | |
| 2004/0128700 | A1 | 7/2004 | Pan | |
| 2004/0135819 | A1 * | 7/2004 | Maa | 345/840 |
| 2004/0163127 | A1 | 8/2004 | Karaoguz et al. | |
| 2004/0176132 | A1 | 9/2004 | Thrasher | |
| 2004/0207723 | A1 | 10/2004 | Davis et al. | |
| 2004/0214541 | A1 | 10/2004 | Choi | |
| 2004/0258059 | A1 | 12/2004 | Frank et al. | |
| 2005/0071686 | A1 * | 3/2005 | Bagga et al. | 713/202 |
| 2005/0146598 | A1 | 7/2005 | AbiEzzi et al. | |
| 2005/0165922 | A1 * | 7/2005 | Hatano | 709/223 |
| 2005/0190700 | A1 | 9/2005 | Melpignano | |
| 2005/0249196 | A1 * | 11/2005 | Ansari et al. | 370/352 |
| 2005/0286711 | A1 * | 12/2005 | Lee et al. | 379/399.01 |
| 2005/0289480 | A1 * | 12/2005 | Mathews et al. | 715/821 |
| 2006/0040638 | A1 | 2/2006 | McQuaide, Jr. | |
| 2006/0080713 | A1 | 4/2006 | Fujibayashi et al. | |
| 2006/0095754 | A1 | 5/2006 | Hyder et al. | |
| 2006/0109268 | A1 * | 5/2006 | Napoli et al. | 345/424 |
| 2006/0181548 | A1 * | 8/2006 | Hafey et al. | 345/619 |
| 2006/0190443 | A1 * | 8/2006 | Mathews et al. | 707/3 |
| 2007/0039025 | A1 | 2/2007 | Kraft et al. | |
| 2007/0115346 | A1 | 5/2007 | Kim et al. | |
| 2007/0118866 | A1 | 5/2007 | Chen | |
| 2007/0139514 | A1 | 6/2007 | Marley | |
| 2007/0147367 | A1 | 6/2007 | Hwang et al. | |
| 2007/0156686 | A1 * | 7/2007 | Kim et al. | 707/7 |
| 2007/0214482 | A1 | 9/2007 | Nguyen | |
| 2007/0216759 | A1 | 9/2007 | Gonen et al. | |
| 2007/0275766 | A1 * | 11/2007 | Kim et al. | 455/566 |
| 2007/0279482 | A1 | 12/2007 | Oswald et al. | |
| 2008/0031169 | A1 * | 2/2008 | Shi et al. | 370/310 |
| 2008/0034325 | A1 * | 2/2008 | Ording | 715/838 |
| 2008/0062249 | A1 | 3/2008 | Nagase et al. | |
| 2008/0066131 | A1 | 3/2008 | Chang et al. | |
| 2008/0150892 | A1 * | 6/2008 | Duhig et al. | 345/156 |
| 2008/0152110 | A1 | 6/2008 | Underwood et al. | |
| 2008/0186410 | A1 | 8/2008 | Hardacker et al. | |
| 2009/0036159 | A1 | 2/2009 | Chen | |
| 2009/0167839 | A1 | 7/2009 | Ottmar | |
| 2009/0320073 | A1 | 12/2009 | Reisman | |
| 2010/0005497 | A1 | 1/2010 | Maresca | |
| 2010/0058408 | A1 | 3/2010 | LaFreniere et al. | |
| 2010/0060477 | A1 | 3/2010 | Laasik et al. | |
| 2010/0060715 | A1 | 3/2010 | Laasik et al. | |
| 2010/0060716 | A1 | 3/2010 | Kert | |
| 2010/0064328 | A1 | 3/2010 | Laasik et al. | |
| 2010/0064329 | A1 | 3/2010 | McLaughlin et al. | |
| 2010/0064333 | A1 | 3/2010 | Blackburn et al. | |
| 2010/0064334 | A1 | 3/2010 | Blackburn et al. | |
| 2011/0043599 | A1 | 2/2011 | Luo et al. | |
| 2011/0173672 | A1 | 7/2011 | Angiolillo et al. | |

FOREIGN PATENT DOCUMENTS

| | | | |
|---|---|---|---|
| EP | 0741484 | A2 | 11/1996 |
| EP | 0919906 | A2 | 11/1998 |
| EP | 1331762 | | 7/2003 |
| EP | 1372333 | A2 | 12/2003 |
| EP | 1622378 | A1 | 2/2006 |
| EP | 1761048 | A2 | 3/2007 |
| EP | 1 860 852 | A1 | 11/2007 |
| EP | 1853013 | | 11/2007 |
| EP | 1912175 | A1 | 4/2008 |
| EP | 1940156 | A2 | 7/2008 |
| EP | 2110796 | A2 | 10/2009 |
| EP | 2353296 | | 8/2011 |
| GB | 2410868 | A | 8/2005 |
| GB | 2463108 | | 3/2010 |
| GB | 2463110 | | 3/2010 |
| GB | 2463124 | | 3/2010 |
| GB | 2463108 | | 8/2012 |
| JP | 2001169368 | | 6/2001 |
| JP | 2004080289 | | 3/2004 |
| JP | 2004312320 | A | 11/2004 |
| JP | 2007067979 | | 8/2005 |
| JP | 2008182463 | | 8/2008 |
| WO | WO 98/51079 | A1 | 11/1998 |
| WO | WO 01/30070 | A1 | 4/2001 |
| WO | WO 01/47210 | A2 | 6/2001 |
| WO | WO 01/67315 | A1 | 9/2001 |
| WO | WO 02/30105 | A1 | 4/2002 |
| WO | WO 02/30116 | A1 | 4/2002 |
| WO | WO 02/082343 | A1 | 10/2002 |
| WO | WO-0282343 | A1 * | 10/2002 |
| WO | WO 03/21960 | A1 | 3/2003 |
| WO | WO 03/028373 | A1 | 4/2003 |
| WO | WO 2005/009019 | A2 | 1/2005 |
| WO | WO 2005/025194 | A1 | 3/2005 |
| WO | WO 2007/098155 | A2 | 8/2007 |
| WO | WO 2007/113580 | A1 | 10/2007 |
| WO | WO 2007/127788 | A2 | 11/2007 |
| WO | WO 2008/030711 | A2 | 3/2008 |
| WO | WO 2009/094291 | A1 | 7/2009 |
| WO | WO-2010026185 | | 3/2010 |
| WO | WO-2010026187 | | 3/2010 |
| WO | WO-2010026190 | | 3/2010 |
| WO | WO-2010026191 | | 3/2010 |

OTHER PUBLICATIONS

International Search Report and Written Opinion of the International Searching Authority from foreign application PCT/EP2009/061416, date of mailing Oct. 21, 2009.

"Advisory Action", U.S. Appl. No. 12/455,210, (Jun. 5, 2012), 2 pages.

"Advisory Action", U.S. Appl. No. 12/584,463, (May 17, 2012), 3 pages.

"Final Office Action", U.S. Appl. No. 12/455,652, (May 16, 2012), 30 pages.

"Non-Final Office Action", U.S. Appl. No. 12/583,007, (Aug. 8, 2012), 6 pages.

"Non-Final Office Action", U.S. Appl. No. 12/584,463, (Aug. 3, 2012), 11 pages.

"Advisory Action", U.S. Appl. No. 12/455,084, (Mar. 21, 2012), 3 pages.

"Final Office Action", U.S. Appl. No. 12/455,084, (Jan. 17, 2012), 16 pages.

"Final Office Action", U.S. Appl. No. 12/455,210, (Mar. 19, 2012), 14 pages.
"Final Office Action", U.S. Appl. No. 12/584,463, (Feb. 24, 2012), 12 pages.
"Foreign Office Action", Great Britian Application No. 0907818.9, (Mar. 14, 2012), 4 pages.
"International Search Report and Written Opinion", Application No. PCT/EP2009/061413, (Apr. 12, 2009), 13 pages.
"International Search Report and Written Opinion", Application No. PCT/EP2009/061418, (Apr. 12, 2009), 13 pages.
"International Search Report and Written Opinion", Application No. PCT/EP2009/061410, (Oct. 20, 2009), 14 pages.
"International Search Report and Written Opinion", International Application No. PCT/EP2009/061409, (Oct. 20, 2009), 15 pages.
"International Search Report and Written Opinion", International Application No. PCT/EP2009/061411, (Nov. 26, 2009), 20 pages.
"International Search Report", Application No. PCT/EP2009/061406, (Dec. 4, 2009), 3 pages.
"International Search Report", GB Application 0907818.9, (Aug. 24, 2009), 1 pages.
"Non-Final Office Action", U.S. Appl. No. 12/455,084, (May 23, 2011), 14 pages.
"Non-Final Office Action", U.S. Appl. No. 12/455,085, (Mar. 15, 2012), 6 pages.
"Non-Final Office Action", U.S. Appl. No. 12/455,210, (Sep. 29, 2011), 14 pages.
"Non-Final Office Action", U.S. Appl. No. 12/455,652, (Jan. 26, 2012), 28 pages.
"Non-Final Office Action", U.S. Appl. No. 12/584,463, (Oct. 13, 2011), 10 pages.
"Search Report and Written Opinion", PCT Application PCT/EP2009/061398, (Oct. 20, 2009), 15 pages.
"Search Report under Section 17", Application No. GB0816276.0, (Nov. 27, 2009), 2 pages.
"Search Report under Section 17", Application No. GB0816271.1, (Nov. 24, 2009), 2 pages.
"Search Report under Section 17", Application No. GB0816275.2, (Nov. 23, 2009), 1 page.
"Search Report under Section 17", Application No. GB0816279.4, (Nov. 26, 2009), 2 pages.
"Search Report", Application No. GB0816278.6, (Dec. 2, 2009), 2 pages.
"Search Report", Application No. GB081628.0, (Nov. 20, 2009), 2 pages.
"Search Report", Application No. GB0816280.2, (Dec. 3, 2009), 1 page.
"Written Opinion of the International Searching Authority", Application No. PCT/EP2009/061406, (Dec. 4, 2009), 5 pages.
"Advisory Action", U.S. Appl. No. 12/455,652, (Aug. 30, 2012), 3 pages.
"Final Office Action", U.S. Appl. No. 12/455,085, (Aug. 16, 2012), 7 pages.
"Non-Final Office Action", U.S. Appl. No. 12/455,084, (Aug. 30, 2012), 29 pages.
"Non-Final Office Action", U.S. Appl. No. 12/455,635, (Aug. 22, 2012), 20 pages.
"Notice of Allowance", U.S. Appl. No. 12/455,210, (Oct. 10, 2012), 4 pages.
"Advisory Action", U.S. Appl. No. 12/455,085, (Nov. 7, 2012), 3 pages.
"Corrected Notice of Allowance", U.S. Appl. No. 12/455,210, (Dec. 5, 2012), 2 pages.
"Examination Report", EP Application No. 0816280.2, (Feb. 29, 2012), 4 pages.
"Examination Report", GB Application No. 0816281.0, (Sep. 13, 2012), 2 pages.
"Final Office Action", U.S. Appl. No. 12/455,635, (Dec. 31, 2012), 25 pages.
"Foreign Office Action", Great Britain Application No. 0816279.4, (Mar. 8, 2012), 5 pages.
"Notice of Allowance", U.S. Appl. No. 12/455,084, (Feb. 11, 2013), 4 Pages.
"Notice of Allowance", U.S. Appl. No. 12/583,007, (Nov. 29, 2012), 4 pages.
"Notice of Allowance", U.S. Appl. No. 12/584,463, (Nov. 16, 2012), 7 pages.
"Corrected Notice of Allowance", U.S Appl. No. 12/455,084, (Apr. 15, 2013), 2 pages.
"Corrected Notice of Allowance", U.S Appl. No. 12/583,007, (Feb. 14, 2013), 2 pages.
"Corrected Notice of Allowance", U.S Appl. No. 12/583,007, (Mar. 21, 2013), 2 pages.
"Notice of Allowance", U.S Appl. No. 12/455,085, (Apr. 12, 2013), 5 pages.
"Corrected Notice of Allowance", U.S Appl. No. 12/455,085, (May 22, 2013), 2 pages.
"Supplemental Notice of Allowance", U.S Appl. No. 12/455,084, (May 29, 2013), 2 pages.

* cited by examiner

COMMUNICATION SYSTEM AND METHOD

RELATED APPLICATION

This application claims priority under 35 U.S.C. §119 or 365 to Great Britain Application No. 0816275.2, filed Sep. 5, 2008. The entire teachings of the above application are incorporated herein by reference.

This invention relates to a communication system and method.

Packet-based communication systems allow the user of a device, such as a personal computer, to communicate across a computer network such as the Internet. Packet-based communication systems include voice over internet protocol ("VoIP") communication systems. These systems are beneficial to the user as they are often of significantly lower cost than fixed line or mobile networks. This may particularly be the case for long-distance communication. To use a VoIP system, the user must install and execute client software on their device. The client software provides the VoIP connections as well as other functions such as registration and authentication. In addition to voice communication, the client may also provide further features such as video calling, instant messaging ("IM"), SMS messaging, and voicemail.

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

A problem with packet-based communication systems is that the accessibility of packet-based communication systems for users is limited. In particular, such systems are most commonly accessed using a personal computer. This has the disadvantage that the user must be sufficiently technically competent to download and install the packet-based communication client software on their personal computer, which provides a barrier to the take-up of the use of the packet-based communication system. Even when the communication client is installed and executed on a personal computer, the use of the packet-based communication system may be limited because personal computers are often not located in a place where the user is either familiar or comfortable with communicating. For example, a personal computer is often located in a study, which is not the most natural or familiar environment for making calls for many users.

Whilst packet-based communication systems can also be accessed via certain mobile devices, these generally do not have processing resources or display screens available to offer a full range of features, such as video calling.

There is therefore a need for a technique to address the aforementioned problems with the accessibility of packet-based communication systems.

According to one aspect of the present invention there is provided a method of initiating a communication event via a packet-based communication network in a media appliance having a processor executing a communication client, comprising: retrieving a stored list comprising a plurality of contacts associated with a user of the communication client; generating a first two-dimensional contact grid comprising a first arrangement of entries; displaying the first contact grid on a display means such that each of a plurality of the entries comprises a graphical representation of a respective one of the plurality of contacts, wherein the graphical representations are sized so as to fit in the entries of the first contact grid; receiving a selection of a subset of the graphical representations in the first contact grid from a user of the communication client; generating a second contact grid comprising a second arrangement of entries corresponding to the selected subset; displaying the second contact grid on the display means in replacement of the first contact grid, such that each of a plurality of the entries comprises a graphical representation of a respective one of the plurality of contacts, and wherein the graphical representations are resized so as to fit in the entries of the second contact grid; receiving a selection of one of the graphical representations in the second contact grid from the user of the communication client; and initiating a communication event with the contact represented by the selected graphical representation via the packet-based communication network.

Preferably, the step of receiving a selection of a subset of the graphical representations in the first contact grid comprises highlighting the subset on the display means and receiving a selection command. Preferably, the step of highlighting comprises displaying a movable selection box on the first contact grid. The method may further comprise the step of receiving commands to move the movable selection box in two-dimensions on the first contact grid from the user of the communication client.

Preferably, the graphical representations comprise information regarding the respective contact comprising at least one of a user identity, a picture for representing the respective contact, presence information, and text data defined by the respective contact. The method may further comprise the step of, upon resizing the graphical representations so as to fit in the entries of the second contact grid, determining whether additional information regarding the respective contact is able to be displayed in the graphical representations.

The method may further comprise the step of, prior to generating the first contact grid, determining whether the number of contacts in the plurality of contacts is smaller than the number of entries in the first contact grid, and if so, reducing the dimensions of the first contact grid to the smallest extent such that the number of entries in the first contact list remains greater than or equal to the number of contacts.

The method may further comprise the step of, prior to generating the first contact grid, determining whether the number of contacts in the plurality of contacts is larger than a predetermined maximum number of entries in the first contact grid, and if so, selecting a group of contacts from the plurality of contacts to be displayed in the first contact grid, wherein the number of contacts in the group of contact equals the predetermined maximum.

The method may further comprise the step of receiving a command from the user to scroll the display of the first contact grid, such that the contacts in the plurality of contacts not in the group of contacts are displayed in the grid.

The method may further comprise the step of receiving alphanumeric data from the user and filtering the displayed graphical representations to display only the graphical representations of contacts matching the alphanumeric data.

The method may further comprise the step of receiving a command to from the user to revert to the display of the first contact grid.

The method may further comprise the steps of: receiving a further selection of a subset of the graphical representations in the second contact grid from a user of the communication client; generating a third contact grid comprising a third arrangement of entries corresponding to the selected subset; and displaying the third contact grid on the display means in replacement of the second contact grid, such that each of a plurality of the entries comprises a graphical representation of a respective one of the plurality of contacts, and wherein the graphical representations are resized so as to fit in the entries of the third contact grid.

Preferably, the communication event is one of a voice call, video call and instant message conversation. Preferably, the communication event is established via a peer-to-peer connection in the packet based communication network.

The display means may be a television set.

Preferably, the media appliance comprises one of television set, a set-top box arranged to connect to a television set, a video disc player arranged to connect to a television set, a personal video recorder arranged to connect to a television set, and a games console arranged to connect to a television set.

According to another aspect of the present invention there is provided a computer program product comprising program code means which, when executed by a computer implement the steps according to the above method.

According to another aspect of the present invention there is provided a media appliance, comprising: a memory storing a communication client application; a processor, coupled to the memory and operable to execute the communication client application, wherein the client application is programmed so as when executed to allow a user to establish a call with one or more other users via a packet-based communication network and output display signals to generate a user interface for display on a display means, wherein the media appliance is arranged to retrieve a stored list comprising a plurality of contacts associated with the user of the communication client, generate a first two-dimensional contact grid comprising a first arrangement of entries, output display signals to display the first contact grid on the user interface such that each of a plurality of the entries comprises a graphical representation of a respective one of the plurality of contacts, wherein the graphical representations are sized so as to fit in the entries of the first contact grid, receive a selection of a subset of the graphical representations in the first contact grid from a user of the communication client, generate a second contact grid comprising a second arrangement of entries corresponding to the selected subset, output display signals to display the second contact grid on the display means in replacement of the first contact grid, such that each of a plurality of the entries comprises a graphical representation of a respective one of the plurality of contacts, and wherein the graphical representations are resized so as to fit in the entries of the second contact grid, receive a selection of one of the graphical representations in the second contact grid from the user of the communication client, and initiate a communication event with the contact represented by the selected graphical representation via the packet-based communication network.

The media appliance may further comprise a remote control unit comprising at least one wireless communication means arranged to transmit data to the processor, a control means coupled to the wireless communication means and configured to control the wireless communication means, and user input means coupled to the control means and arranged to receive input commands from the user and provide the input commands to the control means.

Preferably, the selection of a subset of the graphical representations in the first contact grid and the selection of one of the graphical representations in the second contact grid is received at the control means from the user input means, and transmitted to the communication client using the at least one wireless communication means.

Preferably, the at least one wireless communication means comprises at least one of a radio transmitter and an infra-red transmitter.

The communication client application may be arranged to decode audio and video packets received at the processor over the packet-based communication network as audio and video data. The communication client application may be arranged to encode audio and video signals received at the processor as voice over internet protocol packets and video packets for transmission over the packet-based communication network.

Preferably, the communication client application is programmed to allow the user to establish calls via a peer-to-peer connection in the packet based communication network.

The communication client may be further arranged to highlight the subset on the display means. The communication client may be arranged to highlight the subset by displaying a movable selection box on the first contact grid. The communication client may be further arranged to receive commands from the user of the communication client to move the movable selection box in two-dimensions on the first contact grid.

The graphical representations may comprise information regarding the respective contact comprising at least one of a user identity, a picture for representing the respective contact, presence information, and text data defined by the respective contact.

Preferably, the communication client is further arranged to determine whether additional information regarding the respective contact is able to be displayed in the graphical representations upon resizing the graphical representations so as to fit in the entries of the second contact grid.

The communication client may be further arranged to determine whether the number of contacts in the plurality of contacts is smaller than the number of entries in the first contact grid prior to generating the first contact grid, and, if so, reduce the dimensions of the first contact grid to the smallest extent such that the number of entries in the first contact list remains greater than or equal to the number of contacts.

The communication client may be further arranged to determine whether the number of contacts in the plurality of contacts is larger than a predetermined maximum number of entries in the first contact grid prior to generating the first contact grid, and, if so, select a group of contacts from the plurality of contacts to be displayed in the first contact grid, wherein the number of contacts in the group of contact equals the predetermined maximum.

Preferably, the communication client is further arranged to receive a command from the user to scroll the display of the first contact grid, such that the contacts in the plurality of contacts not in the group of contacts are displayed in the grid.

The communication client may be further arranged to receive alphanumeric data from the user and filter the displayed graphical representations to display only the graphical representations of contacts matching the alphanumeric data.

Preferably, the communication client is further arranged to receive a command to from the user to revert to the display of the first contact grid.

The communication client may be further arranged to receive a further selection of a subset of the graphical representations in the second contact grid from a user of the communication client, generate a third contact grid comprising a third arrangement of entries corresponding to the selected subset, and output display signals to display the third contact grid on the display means in replacement of the second contact grid, such that each of a plurality of the entries comprises a graphical representation of a respective one of the plurality of contacts, and wherein the graphical representations are resized so as to fit in the entries of the third contact grid.

The communication event may be one of a voice call, video call and instant message conversation.

For a better understanding of the present invention and to show how the same may be put into effect, reference will now be made, by way of example, to the following drawings in which.

Figure 1:
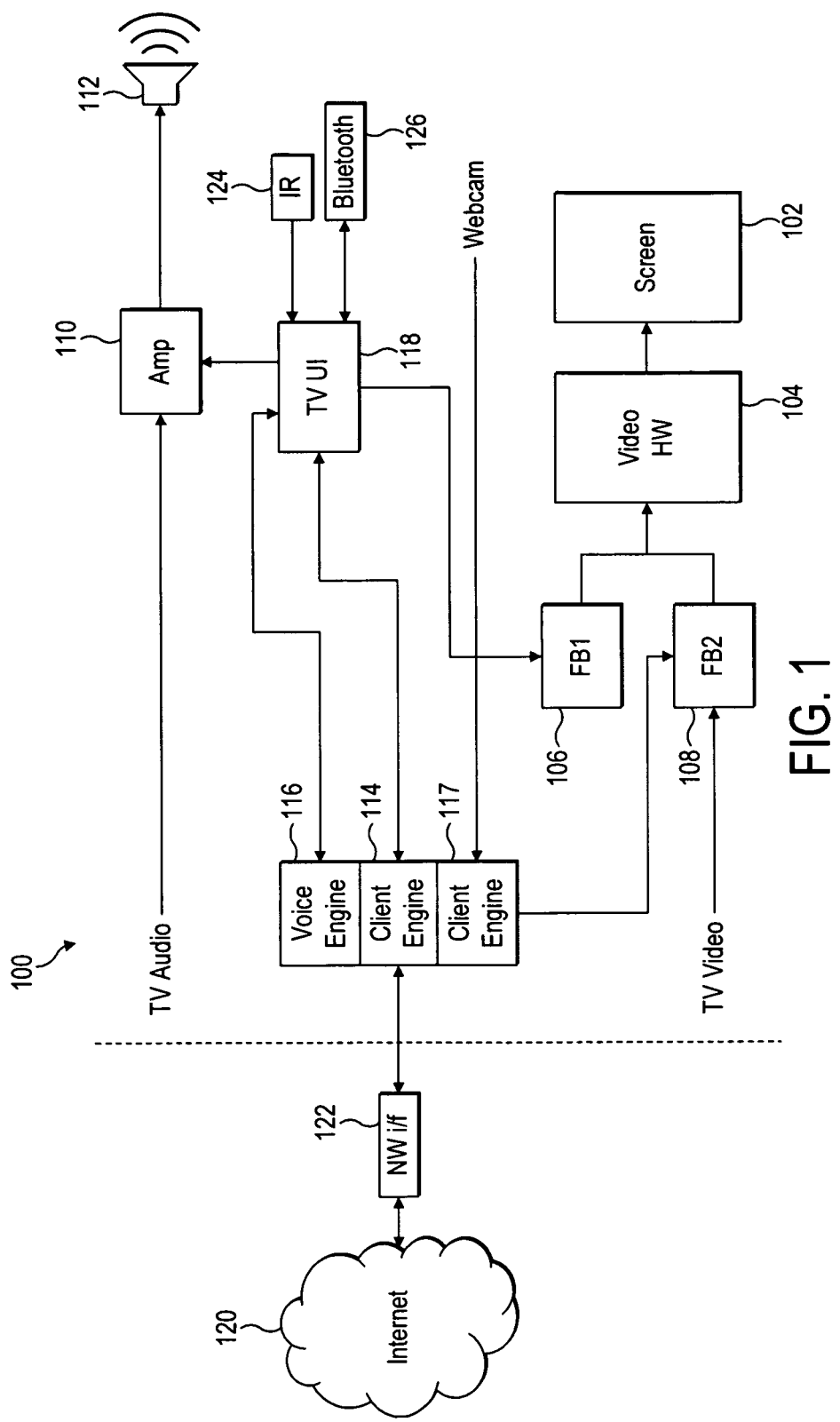
FIG. 1 is a block diagram showing the functional blocks of a TV with an embedded communication client.

In order to overcome the above-mentioned problems with packet-based communication systems, a technique has been developed to enable a user to access such systems from a television ("TV"). This is achieved either by embedding the communication client into the TV itself, or through a separate set-top box ("STB") connected to the TV. In alternative embodiments, the embedded communication client can reside in another device connected to a TV, such as a games console or video playback device (e.g. a video disc player or a personal video recorder).

This is advantageous because the TV can be provided with all the embedded hardware and software required to access the packet-based communication system built-in. Alternatively, this can be embedded into a STB (or other TV-connected device) which is readily connected to an existing TV using known interfaces (such as a HDMI, SCART or component interface, for example). This eliminates the need for the user to download and install software on their personal computer, and provides a simpler method by which non-technical users can access the packet-based communication system in their home. In addition, the TV is typically located in a living room of a house, which enables the packet-based communication system to be accessed from the location in the house which is most familiar to many users for communicating with friends and relatives due to this being the traditional location for landline PSTN telephones.

The embedding of a packet-based communication client in a TV also has the advantage that a large screen is present, which can be utilised for video calling. Furthermore, significant processing power can be provided in the TV, particular as the power requirements for a large, mains electricity powered consumer electronics device are less stringent than, for example mobile devices. This enables a full range of features to be included in the embedded communication client, such as high quality voice and video encoding.

However, known TVs are not designed to accommodate any form of bi-directional communications. A system is therefore required for enabling user interaction with the TV for making and receiving calls and messages which is intuitive for users. To achieve this, the remote control of the TV is enhanced to provide functionality which enables the user to make and receive calls, as well as send and receive messages using the TV.

However, a problem with providing calling functionality on a TV is that conventional user interfaces used for packet-based communication systems are not clearly viewed on TV screens. This is because the resolution of TV screens is generally lower than that of personal computer monitors. For example, standard TV resolution has only 480 vertical lines. Even if high definition TVs are used, then these still only have between 720 and 1080 vertical lines. The problems with resolution are also exacerbated due to the fact that users generally view TV screens from a considerable distance away from the TV. Typically, a user sits a distance from the TV in the order of several metres or more. This is in contrast to personal computer monitors, which are typically viewed from less than a metre away. As a result of this, small items displayed in the user interface of the communication are not clearly visible if the user interface is ported directly from the personal computer to the TV. For example, the communication client user interface comprises a contact list showing the contacts of the user. If this is displayed simply as a list of names (as done on a personal computer) then this is very difficult for the user to read from a distance on a potentially low resolution TV screen.

Furthermore, the user also needs to be able to easily and intuitively select items in the user interface, for example to initiate communication events with other users. A pointing device such as a mouse can be used on a personal computer, which gives flexibility in the user interface layout, but these are not available on a TV. Rather, the user must navigate the embedded communication client using a remote control unit.

Reference is now made to FIG. 1, which illustrates the hardware and software functional blocks embedded in a TV 100. The TV 100 comprises a screen 102 for displaying images to the user, which is driven by video driver hardware 104 arranged to convert the video signals into the form required to be correctly displayed on the screen 102. The video driver hardware 104 is provided with digital video data from two frame buffers 106 and 108. The frame buffers 106 and 108 are storage devices that buffer video data that is to be displayed to the user. Frame buffer 2 ("FB2") 108 receives standard TV video signals, as is known for the display of broadcast TV, and video call signals received over the packet-based communication system. Frame buffer 1 ("FB1") 106 stores video data related to the packet-based communication client, as will be described presently. An audio amplifier 110 receives TV audio signals and amplifies these for output through at least one speaker 112.

The TV audio and video input signals themselves originate from television signals broadcast via any suitable means such as a satellite repeater stations, wireless terrestrial repeater stations or cable; and received by a television receiver unit of the TV 100 (not shown). Note that broadcasting is distinct from point-to-point communication, including being distinct from multicasting (i.e. point-to-multipoint). In broadcasting, signals are transmitted indiscriminately, i.e. regardless of whether the user has selected to receive the signal (although a decryption key or such like may still be required so that only authorised users can access the broadcast); whereas in point-to-point communication, signals must be requested by the user or users receiving them. Or put another way, to receive a broadcast a user simply "tunes in" without needing to send any signal to the broadcaster, whereas to establish a point-to-point connection then signals must be exchanged between the user and broadcaster.

The TV receiver unit may comprise for example an antenna, satellite dish or cable input; sampling circuitry; a filter; a low noise amplifier; a mixer, and/or an analogue to digital converter.

After being received by the receiver unit, the signals are then processed by a signal processing apparatus (also not shown) before being input to the frame buffers and amplifiers of FIG. 1. The signal processing may comprise for example a digital filter, demultiplexer, decoder, decryption block, and/or error checking block; which may be implemented in on-chip hardware in the form of one or more on-chip peripherals (not shown), off-chip hardware in the form of one or more off-chip units accessed via one or more of the I/O peripherals, or in software stored in a memory and executed on a central processing unit (CPU) of the television 100 (not shown), or in any combination of these.

The packet-based communication client embedded in the TV 100 is based around four main elements. Preferably, these four elements are software elements that are executed on a processor and stored in a memory. The four elements are: a client engine 114; a voice engine 116; a video engine 117; and a TV user interface 118.

The client engine 114 is responsible for setting up connections to the packet-based communication system. This is performed via a connection from the TV 100 to the internet 120. The TV 100 is connected to the internet 120 via a network interface 122 such as a modem, and the connection between the TV 100 and the network interface 122 may be via a cable (wired) connection or a wireless connection. The client engine 114 performs call set-up, authentication, encryption and connection management, as well as other functions relating to the packet-based communication system such as firewall traversal, presence state updating, and contact list management.

The voice engine 116 is responsible for the encoding of voice signals input to the TV 100 as VoIP packets for transmission over the internet 120 and the decoding of VoIP packets received from the internet 120 for presentation as audio information to the user of the TV 100.

The video engine 117 is responsible for the encoding of video signals input to the TV (e.g. from a webcam or other video camera) as video packets for transmission over the internet 120 in a video call, and the decoding of video packets received from the internet 120 in a video call for presentation as video images to the user of the TV 100.

The TV user interface ("UI") 118 is responsible for presenting visual information to the user of the TV 100 in the form of a graphical user interface displayed on the TV screen 102.

The client engine 114 is connected to the TV UI 118 in order to control what the UI displays to the user. The client engine 114 is also closely integrated with the voice engine 116 and video engine 117 for the efficient transmission and receiving of voice and video packets over the internet.

The voice engine 116 is connected to the TV UI 118 as voice signals from the user are passed through the TV UI 118 to the voice engine 116, and vice versa. The video engine 117 is connected to FB2 108 for providing video data to be displayed on the TV screen 102.

The TV UI 118 is connected to FB1 106, so that the graphical user interface data is buffered and ultimately displayed to the user on the screen 102. The TV UI 118 is also connected to the amplifier 110, enabling sound (such as voice signals or notifications) to be produced from the TV speakers 112. The TV UI 118 is also connected to an infra-red ("IR") receiver 124 and a bluetooth transceiver 126 which are used for communicating with a remote control unit.

Note that if the embedded communication client is provided in the form of a STB (or other TV-connected device) for connection to a TV, then the system in FIG. 1 differs only in that the screen 102, amplifier 110 and speaker 112 (and optionally the video driver hardware 104) blocks are located in the TV itself, whereas the remaining functional blocks are located in the set top box, which is connected to the TV.

Figure 2:
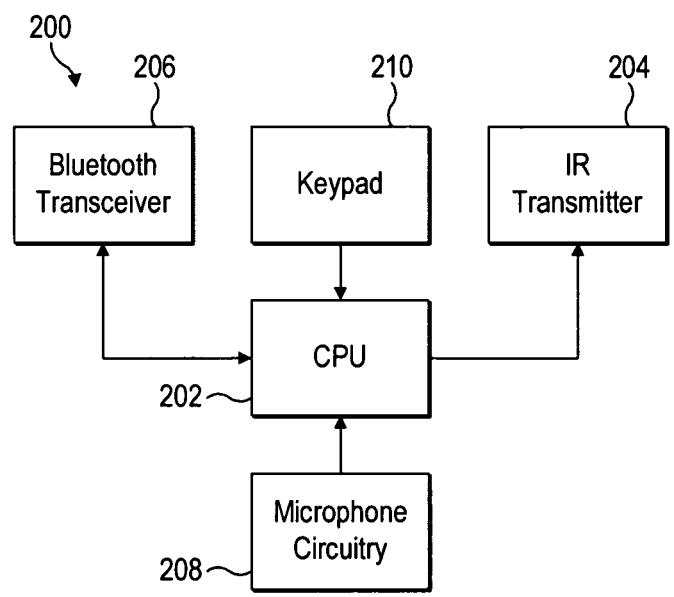
FIG. 2 is a block diagram showing the functional blocks of a remote control unit for use with the TV of FIG. 1.

Reference is now made to FIG. 2, which illustrates the functional blocks of a remote control unit 200 arranged to communicate with the TV 100 of FIG. 1. The remote control unit 200 comprises a central processing unit ("CPU") 202 arranged to control the operation of the remote control unit 200. In particular, the CPU 202 controls the sending and receiving of data between the TV 100 and the remote control unit 200.

The remote control unit 200 is arranged to communicate with the TV 100 by two different methods. Firstly, the remote control comprises an IR transmitter 204, which sends IR signals to the IR receiver 124 in the TV 100. This is performed in a similar manner to conventional remote control units used with televisions. This has the advantage of being power efficient, which is important for a battery powered device such as a remote control. However, this also has the disadvantage of requiring a line-of-sight signal path and has a low data rate. The IR transmitter 204 is therefore used for sending commands to the TV 100. These commands include conventional TV commands, such as changing channels, switching to standby and adjusting volume, as well as commands relating to the embedded communication client, as will be described hereinafter.

The second method for communicating with the TV 100 is by a Bluetooth connection. The remote control unit 200 comprises a Bluetooth transceiver 206 which is able to communicate with the Bluetooth transceiver 126 located in the TV 100. Bluetooth is a low-power short-range radio standard, and therefore does not require a line-of-sight signal path. Higher data rates are also available for Bluetooth connections, compared to IR. The Bluetooth transceiver 206 is paired with the Bluetooth transceiver 126 located in the TV 100 such that a data connection can be readily formed between them. The data connection enables the transmission of data from the remote control unit 200 to the TV 100, and, optionally, the reception of data from the TV 100 at the remote control unit 200.

The IR transmitter 204 and the Bluetooth transceiver 206 are connected to the CPU 202, and the CPU 202 controls the activation of these units and provides them with the data to be sent (and optionally reads the data received by the Bluetooth transceiver 206).

Also connected to the CPU 202 is microphone circuitry 208. The microphone circuitry 208 is arranged to receive audio information such as speech from the user of the remote control unit 200 and provide the audio information to the CPU 202 for processing. The audio information can be speech which is subsequently sent to the TV 100, and transmitted over the internet as VoIP packets, as will be described in more detail hereinafter. The microphone circuitry 208 comprises a microphone, an amplifier, and an analogue-to-digital converter for generating a digital representation of the audio signals which can be input to the CPU 202.

Also connected to the CPU 202 is a keypad 210, which enables the user to enter commands to the remote control unit 200.

Optionally connected to the CPU 202 is speaker circuitry (not shown). The speaker circuitry is arranged to receive audio data from the CPU 202 and generate audible sound that the user of the remote control can hear. The speaker circuitry can comprise a digital-to-analogue converter, an amplifier and a speaker. The speaker circuitry can be used to enable the user of the remote control unit 200 to hear voice calls from a remote party over the internet, as will be described later.

Figure 3:
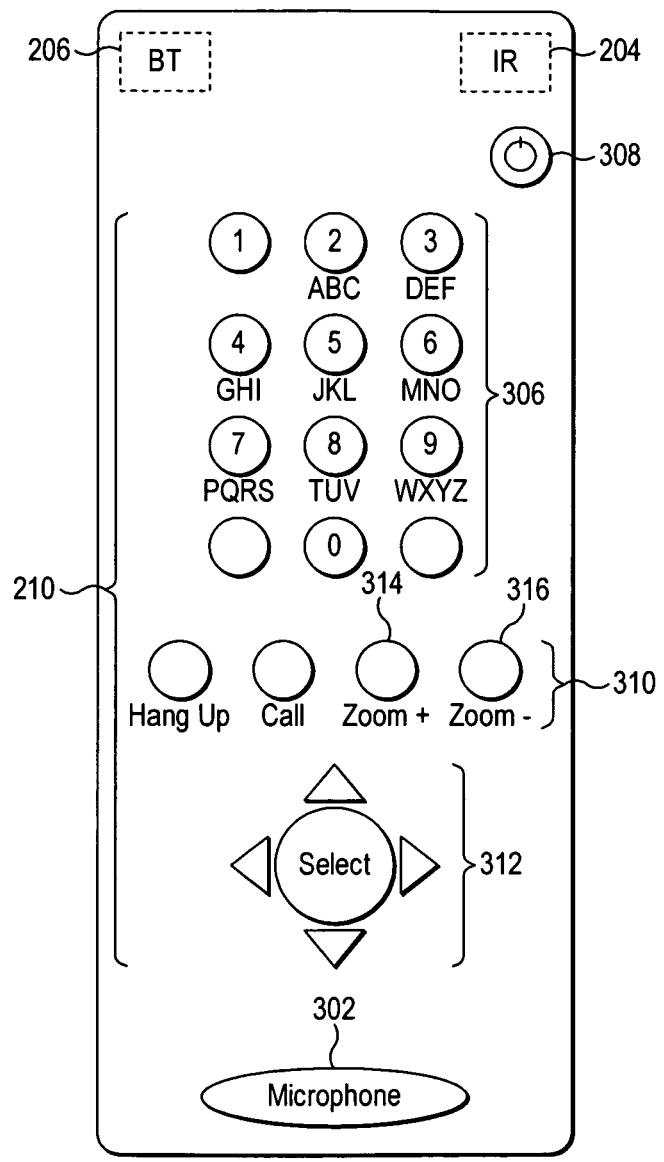
FIG. 3 shows the physical layout of a remote control unit.

Reference is now made to FIG. 3, which illustrates the physical layout of the remote control unit 200. The remote control unit 200 resembles conventional remote controls for TVs. However, the remote control unit 200 includes an integrated microphone 302, and, optionally, an integrated speaker (not shown). This enables the remote control unit 200 to be held to the head of the user in a similar manner to a conventional telephone or placed on front of the user in a manner similar to a voice conferencing apparatus. Integrated within the unit are an IR transmitter 204 and Bluetooth transceiver 206, as described above.

The remote control unit 200 comprises a keypad 210, as mentioned above. The keypad 210 comprises a numeric keypad 306, which is used for conventional TV control purposes, and also for entering information for the embedded packet-based communication client. The numeric keypad 306 comprises numbered keys that can also be used to enter alphabetic characters. A standby button 308 is used for placing the TV 100 into standby mode. Dedicated function keys 310 are used to control the operation of the packet-based communication client, and a directional pad 312 is used for navigating the TV user interface.

Figure 4:
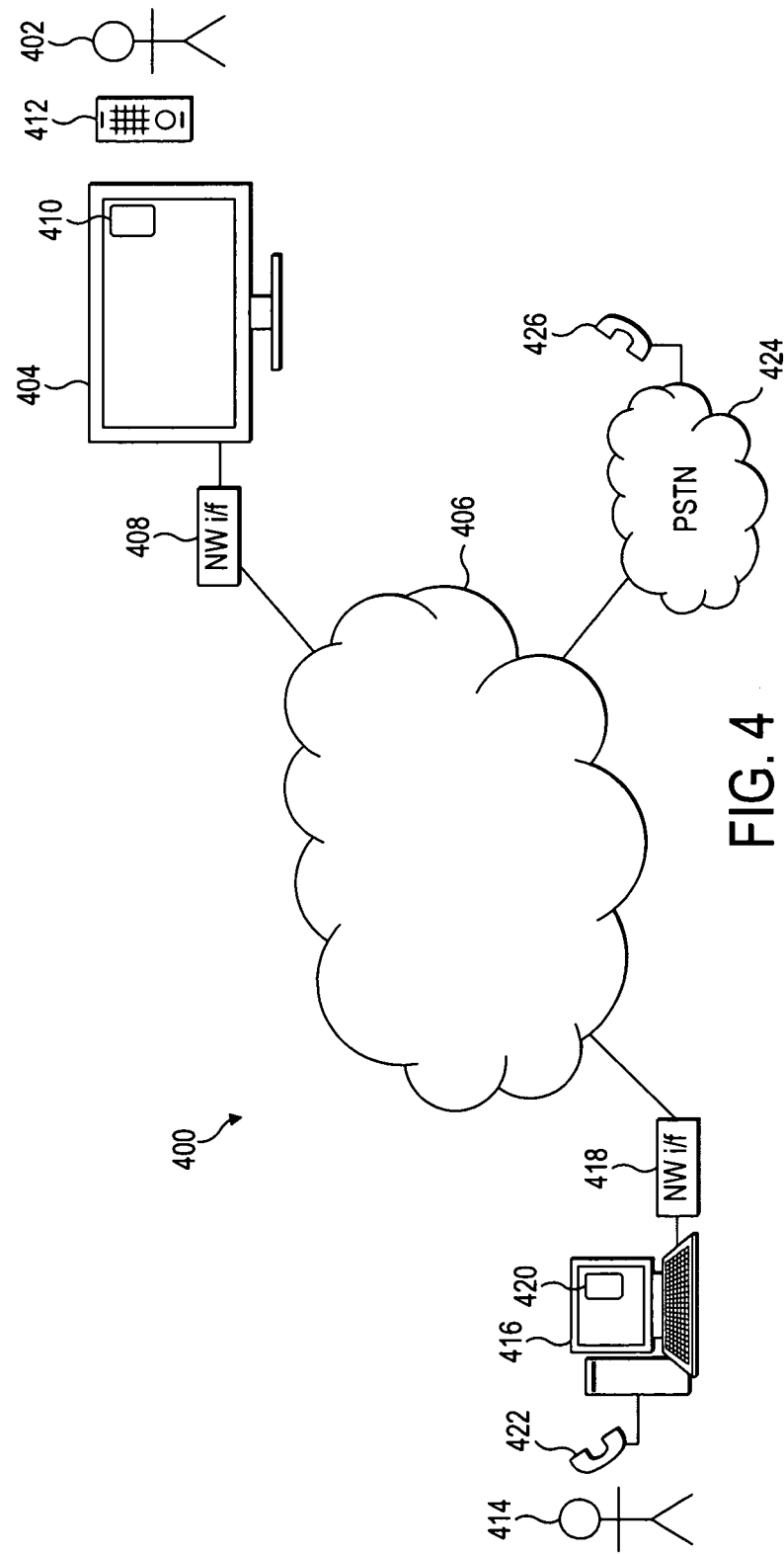
FIG. 4 shows an illustrative packet-based communication system.

In order to describe the operation of the TV 100 and enhanced remote control unit 200 with the packet based communication system, and particularly the operation of the enhanced UI, reference is now made to FIG. 4, which illustrates the use of the TV 100 in a portion of an example system 400.

Note that whilst the illustrative embodiment shown in FIG. 4 is described with reference to a P2P communication system, other types of communication system could also be used, such as non-P2P, VoIP or IM systems. The system 400 shown in FIG. 4 shows a first user 402 of the communication system operating a TV 404, which is shown connected to a network 406. Note that the communication system 400 utilises a network such as the Internet.

The TV 404 is connected to the network 406 via a network interface 408 such as a modem, and the connection between the user terminal 104 and the network interface 108 may be via a cable (wired) connection or a wireless connection. The TV 404 shown in FIG. 4 is a standalone unit, but it should be appreciated that a separate TV and STB (or other TV-connected device) can also be used.

The TV 404 is executing an embedded communication client 410. Note that in alternative embodiments, the embedded communication client can be executed in a set top box. The embedded communication client 410 comprises software executed on a local processor in the TV 404.

The TV 404 is arranged to receive information from and output information to the user 402. A remote control unit 412 acts as the input device operated by the user 402 for the control of the TV 404. The remote control 412 comprises a microphone and (optionally) a speaker to enable the user to speak and (optionally) listen in a voice call. The remote control unit 412 communicates wirelessly with the TV 404, as described previously.

The TV 404 can also receive broadcast television signals, and display these as video (television programmes) to the user on the TV screen. The broadcast television signals can be delivered by terrestrial, satellite or cable broadcasting, and be in the form of analogue signals or digital data. The user 402 can control the display of the television signals (e.g. which channels to display) using the remote control unit 412.

The embedded communication client 410 is arranged to establish and manage calls made over the packet-based communication system using the network 406. The embedded communication client 410 is also arranged to present information to the user 402 on the screen of the TV 404 in the form of a user interface. The user interface comprises a list of contacts associated with the user 402. Each contact in the contact list has a presence status chosen by the contact associated with it, and each of these contacts have authorised the user 402 of the client 410 to view their contact details and the contact-defined presence information.

The contact list for the users of the packet-based communication system is stored in a contact server (not shown in FIG. 4). When the client 410 first logs into the communication system the contact server is contacted, and the contact list is downloaded to the client 410. This allows the user to log into the communication system from any terminal and still access the same contact list. The contact server is also used to store a mood message (a short user-defined text-based status that is shared with all users in the contact list) and a picture selected to represent the user (known as an avatar). This information can be downloaded to the client 410, and allows this information to be consistent for the user when logging on from different terminals. The client 410 also periodically communicates with the contact server in order to obtain any changes to the information on the contacts in the contact list, or to update the stored contact list with any new contacts that have been added.

Also connected to the network 406 is a second user 414. In the illustrative example shown in FIG. 4, the user 404 is operating a user terminal 416 in the form of a personal computer. Note that in alternative embodiments, other types of user terminal can also be connected to the packet-based communication system. In addition to personal computers ("PC") (including, for example, Windows™, Mac OS™ and Linux™ PCs), a personal digital assistant ("PDA"), a mobile phone, or a gaming device could also be connected. In a preferred embodiment of the invention the user terminal 416 comprises a display such as a screen and an input device such as a keyboard, mouse, joystick and/or touch-screen. The user device 416 is connected to the network 406 via a network interface 418 such as a modem.

Note that in alternative embodiments, the user terminal 416 can connect to the communication network 406 via additional intermediate networks not shown in FIG. 4. For example, if the user terminal 416 is a mobile device, then it can connect to the communication network 406 via a mobile network (for example a GSM or UMTS network).

The user terminal 416 is running a communication client 420, provided by the software provider. The communication client 420 is a software program executed on a local processor in the user terminal 416 comprising similar elements to the embedded communication client 410. The communication client 420 enables the user terminal 416 to connect to the packet-based communication system. The user terminal 416 is also connected to a handset 422, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 416, or integrated into the user terminal 416 itself.

Figure 5:
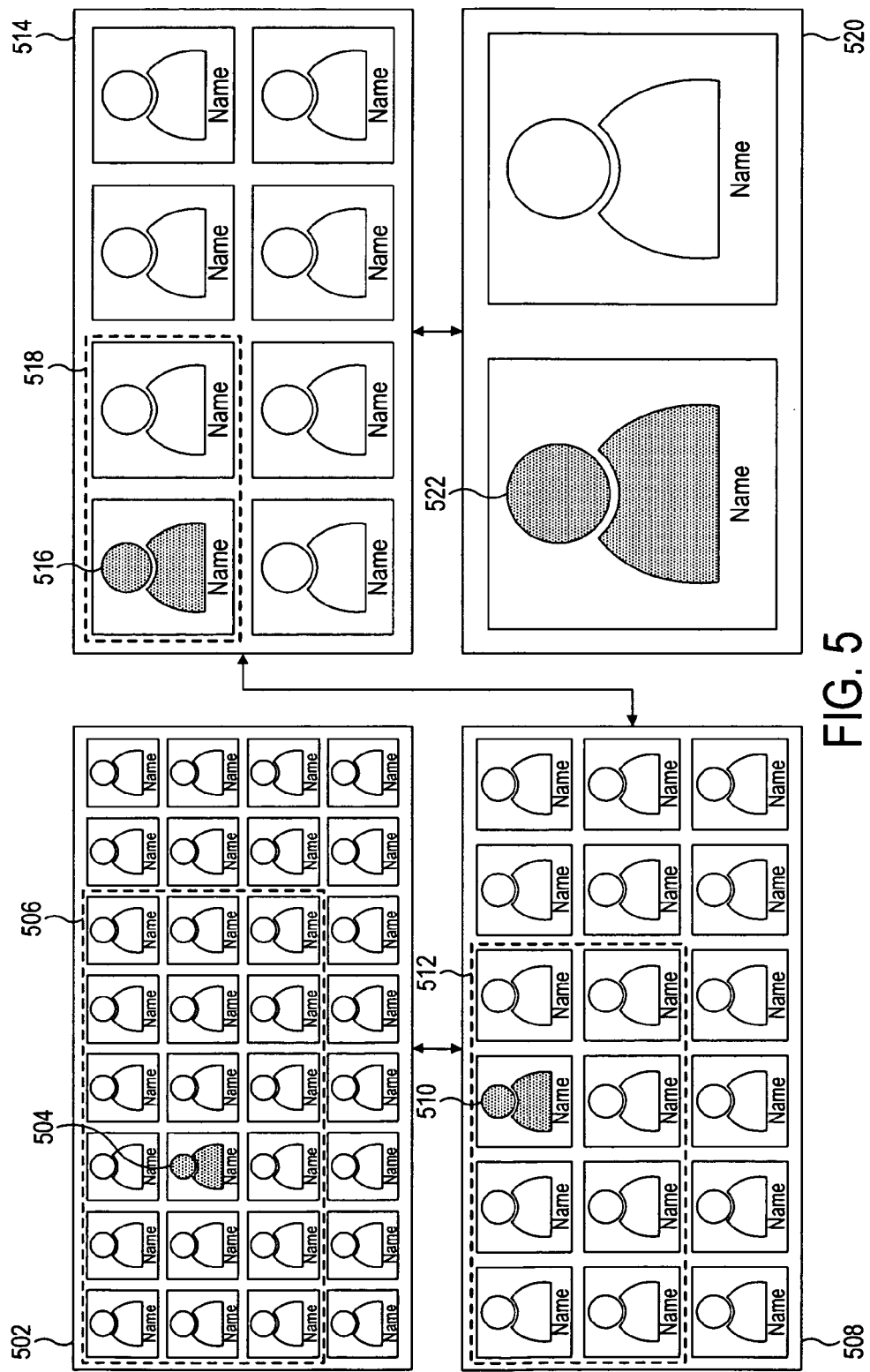
FIG. 5 shows a contact selection user interface displayed on the TV.

Reference is now made to FIG. 5, which illustrates a user interface displayed on the TV 100 by the TV UI 118. Specifically, FIG. 5 illustrates the display of the user's contact list in the form of a contact grid.

The user can use the remote control unit 200 to cause the display of the contact grid, and use the contact grid for initiating a call to another party (as described below). The TV UI 118 has a "call set up" state which can be entered by the user. The call set up state can be entered by the user selecting a calling functionality option using the remote, for example using a dedicated button on the remote or by navigating to an on-screen option using the directional pad (312 in FIG. 3). Alternatively, the call entry state can be entered by performing a physical action on the remote, such sliding out a movable microphone. In response to this a command is sent to the TV 100 which causes the call entry state to be entered. Typically, the call entry state displays a UI to the user comprising the contact grid.

When the contact grid is first displayed on the TV screen 102, an initial grid 502 of contacts is shown. The initial grid displays a two-dimensional array of contacts of the user. Preferably, the grid displays the avatar of each of the contacts of the user and the name of the user. In addition, further information about each contact can also be displayed, such as presence information and mood message information can also be displayed, depending on the size of the grid (as described below).

Figure 6:
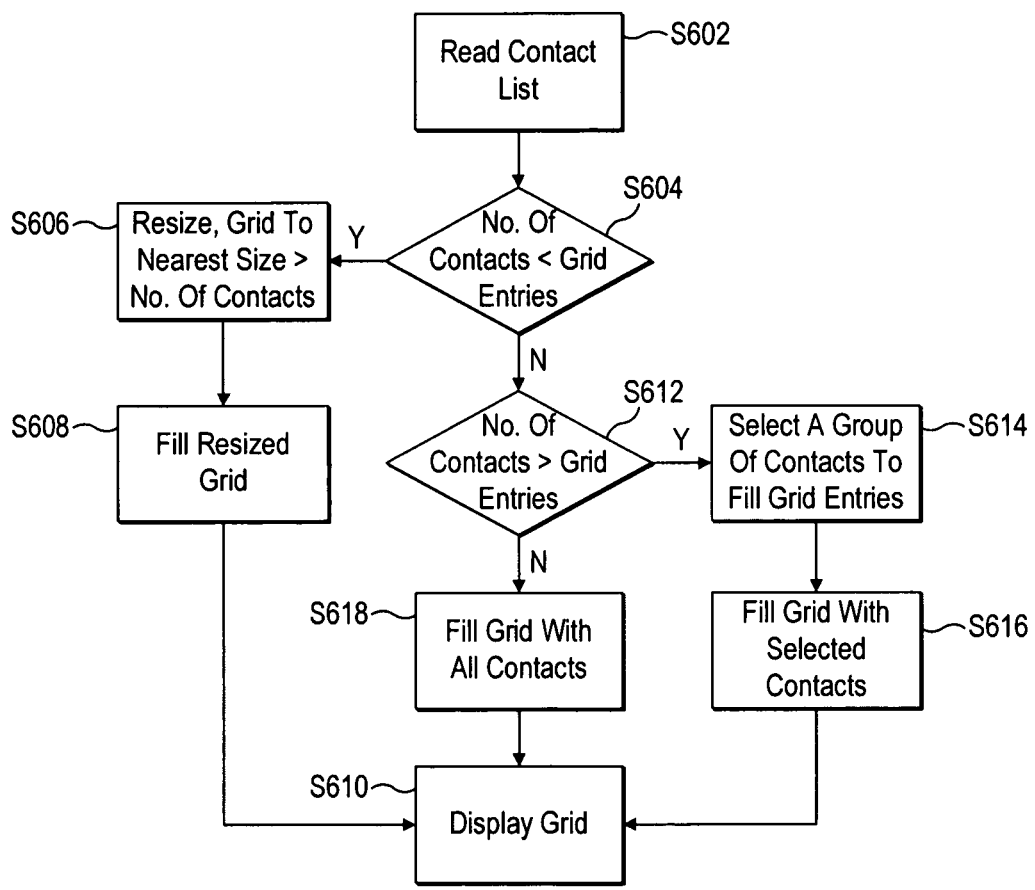
FIG. 6 shows a flowchart of a process for displaying contacts.

The size of the initial grid 502 displayed to the user depends on the number of contacts that the user has in his contact list. This is described with reference to the flowchart shown in FIG. 6. In step S602, the TV UI 118 reads the contact list of the user to determine how many contacts the user has. In step S604 it is determined whether the number of contacts is less than a predetermined maximum number of initial grid entries. The ma maximum number of initial grid entries can be predefined in the client or can be user-defined. The maximum number of initial grid entries defines the largest number of entries that the contact grid can have in its initial view. The value for this is selected in order to provide a balance between being able to display a large number of contacts whilst retaining clarity for the user when displayed on the TV screen 102.

If it is determined in S604 that the number of contacts is less than the maximum number of initial grid entries, then, in step S606 a grid size is chosen for the initial grid 502 which is the smallest size that can accommodate all of the contacts. In other words, the initial grid size is chosen such that the number of entries in the grid is as close as possible to the number of contacts, without being less than the number of contacts. The precise dimensions of the grid can also be constrained by the requirement to fill the TV screen. For example, only certain grid sizes are available, such as 8×4, 6×3, 4×2 entries etc. The smallest grid size out of these available sizes is selected that can fit all of the contacts. In step S608 the grid of the selected size is filled with the contacts and displayed on the TV screen in S610. Note that this initial grid may not be fully filled, but may have empty entries if the number of contacts is not equal to the number of entries in the selected grid size.

If it is determined in step S604 that the number of contacts is not less the maximum number of initial grid entries, then, in step S612 it is determined whether the number of contact is greater than the maximum number of initial grid entries. If this found to be the case, then in S614 a group of the contacts is selected to be included in an initial grid having the maximum number of initial grid entries. Note that the number of grid entries is not increased beyond the maximum number of initial grid entries for the display of the initial grid 502, as this results in the initial grid 502 being hard to read on the TV screen 102. The specific group of contacts chosen to be displayed in the initial grid 502 can be selected by a number of methods. For example, this can be done alphabetically, such that the contacts are simply placed into the initial grid 502 in alphabetical order until all entries are filled. Alternatively, a more complex selection can be used based, for example, on recording which contacts are called most frequently, and displaying these in the initial grid 502. In step S616 the chosen group of contacts are placed in the initial grid, and this is displayed in S610. In this case, all entries in the initial grid are filled. The user can view the contacts not included in the selected group of contacts by moving along the grid (vertically or horizontally) using the directional pad 312 towards the edges of the grid such that the initial grid scrolls to show the remaining contacts (but does not change size).

If it is determined in S612 that that the number of contacts is not greater the maximum number of initial grid entries, then this means that the number of contacts must be equal to the maximum number of initial grid entries. In this instance the size of the initial grid is set to the maximum number of initial grid entries and simply filled with all of the contacts of the user in step S618 and displayed in S610.

Returning to FIG. 5, the user can navigate the initial grid 502 using the directional pad 312 on the remote control unit 200, such that a particular user can be highlighted (e.g. user 200). The user can initiate communication with the highlighted user by selecting an "OK" button in the directional pad 312 or actuating a "call" button on the remote control unit. The initiation of a call is described in more detail hereinafter.

In order to enable the user to be able to clearly view the information in the contact grid on a low-resolution TV or when sitting a long way from the TV, the contact grid is able to change size in order to give the user the impressing of being able to "zoom in" or "zoom out" on the contact grid. In other words, a subset of contacts can be selected and displayed full-screen, so that the size of the grid entries are larger and more visible.

Whenever a contact is highlighted in the initial contact grid 502 the TV UI 118 displays a selection box 506 which indicates the size of the next "zoom" level. In other words, the selection box 506 indicates the size of the grid that will be displayed if the user chooses to zoom in. As the highlighted contact is moved using the directional pad 312, the selection box 506 is also moved to show which group of contacts will be displayed on the next "zoom" level.

For example, in FIG. 5, the contact 504 is highlighted and selection box 506 is displayed indicating that if the user zooms in, then a 6×3 grid will be displayed. The user can activate the grid zoom function using a button on the remote control unit 200, such as "zoom+" button 314 in FIG. 3.

When the user selects to zoom in on the initial grid 502 a second grid 508 is shown (with as size 6×3, as mentioned above). Because the screen resolution is the same, but fewer contacts are displayed (due to a smaller grid with less entries) the contacts shown are larger. The avatar and size of the text of the contact name can therefore be resized to make them larger. These are therefore more visible on the TV screen.

The user can zoom in further. For example, when a contact 510 is selected, a selection box 512 is shown which indicates that the next level of zoom is a 4×2 grid. If the user selects the "zoom+" button 314, a third grid 514 is shown. This displays even fewer, and hence larger, contacts. The zooming process can continue, for example when selecting contact 516 the selection box 518 is shown and when "zoom+" button 314 is actuated a fourth contact grid 520 is displayed. The zooming operation can continue until only a single contact is shown, for example by selecting contact 522 in grid 520 and selecting the "zoom+" button.

Optionally, the TV UI 118 can be configured to perform automatic actions in response to the user zooming in on the grid until there is only a single contact visible. For example, the TV UI 118 can cause the client engine 114 to automatically intimate a call to this user when the user zooms in on this single contact, or alternatively automatically prompt the user for conformation that such a call should be established.

At each zoom level the contact information displayed in the grid becomes larger, and more visible on the TV screen. In addition, the TV UI 118 can be configured to display more information about the contact as the size of the contact gets larger (as the grids get smaller). For example, when a grid having less than a first predetermined number of entries is displayed (i.e. the grid has been zoomed to a certain level), the presence information for the contact can be displayed (in addition to the avatar and name). When a grid having less than a second predetermined number of entries is displayed (i.e. the grid has been zoomed yet further), the mood messages of the contacts can be displayed (in addition to other contact information). That is, the smaller the subset of contacts that is displayed, the more detail is displayed for each contact.

It should be noted that whenever a grid is displayed that has fewer entries than the number of contacts (i.e. for all the zoomed grids, and for the initial grid if the user has a large number of contacts) the user can use the direction pad 312 to "pan" around the grid as if he were viewing a portion of a larger grid that contained all the contacts. Therefore, the user can access any of his contacts from any level of zoom or grid size.

The user can also choose to "zoom out" of contact grid and see more of their contacts. The user can select to do this by actuating the "zoom–" button 316 on the remote control unit. For example, from grid 520 the user can zoom out to grid 514, and from there to grid 508, and from there to grid 502. The user is able to keep "zooming out" the contact grid to display a larger number of contacts until the grid is of a such size that it is able to display all the contacts of the user, or until a maximum zoomed out grid size is reached. Note that the maximum zoomed out grid size can be different to the maximum number of initial grid entries, as the maximum number of initial grid entries only defines a suitable size for an initial clear view of the contacts, and the user may wish to zoom out further than this if they have a large number of contacts.

Optionally, the displayed members of a grid may be selected using a alphanumeric filter. The user can enter a text string using the keys 306 on the remote control unit 200. The text string is matched with the names of the contacts that contain the text string, and only those contacts are displayed in the grid (of whatever size). In one embodiment, a text string that is less than a predetermined number of characters is matched only to names that begin with the text string. A text string that is equal to or more than the predetermined number of characters is matched to names containing the text string.

As mentioned, the user can navigate the contact grid (of whatever size) using the directional pad 312 on the remote control unit 200, and highlight a chosen contact. The user can initiate communication with the highlighted user by selecting an "OK" button in the directional pad 312 or actuating a "call" button on the remote control unit as described below with reference again to FIG. 4.

Presuming that the second user 414 is listed in the contact grid (e.g. as contact 504 in grid 502) presented to the first user 402, then the first user 402 can initiate a call to the second user 414 over the packet-based communication system. The call set-up is performed using proprietary protocols, and the route over the network 406 between the calling user and called user is determined by the peer-to-peer system without the use of servers.

Following authentication through the presentation of digital certificates (to prove that the users are genuine subscribers of the communication system—described in more detail in WO 2005/009019), the call can be established.

The remote control detects that the user has selected to initiate a call (e.g. by pressing a "call" button), and sends an IR command to the TV 100 using the IR transmitter 204. This command informs the TV 100 that the user has selected to initiate the call. In parallel with this, the remote control unit 200 activates the Bluetooth transceiver 206. The Bluetooth transceiver 206 is not activated until it is needed to save battery power consumption. This is because the Bluetooth transceiver 206 is considerably more power-hungry than the IR transmitter 204, and is not required for controlling TV functionality (changing channels etc.), so can be deactivated until it is required for communication functionality.

The Bluetooth transceiver 206 establishes a connection with the Bluetooth transceiver 126 in the TV 100. The microphone circuitry 208 is enabled, such that audio inputs to the microphone are input to the CPU 202. This saves further power at the remote control unit, as the microphone circuitry remains deactivated until it is required for communication functionality.

When the TV UI 118 receives the command transmitted via the IR transmitter 204 at the IR receiver 124, this is interpreted this as a call initiation command. Note that in alternative embodiments, the IR command sent from the remote control unit 200 can be omitted, and the establishment of the Bluetooth connection between the TV 100 and the remote 200 can be interpreted as a call initiation command instead.

The TV UI 118 sends a message to the client engine 114 to initiate the call to the second user 414. In response to the call initiation message, the client engine 114 establishes the call connection with the communication client 420 of the second user 414.

When the user 402 talks into the microphone 302 (shown in FIG. 3), the audio signal is converted to digital data by the microphone circuitry 208 and input to the CPU 202. The CPU 202 controls the Bluetooth transceiver 206 to transmit the audio signal to the Bluetooth transceiver 126 of the TV 100. The transmission of the audio can utilise a standard Bluetooth protocol for transmitting audio information.

Upon receiving the audio information at the Bluetooth transceiver 126, the TV UI 118 passes the audio information to the voice engine 116. The voice engine 116 encodes the audio information as VoIP packets and passes these to the client engine 114. The client engine 114 transmits the VoIP packets to the network 406 via the network interface 408, where they are routed to the communication client 420 running on the user terminal 416 of the second user 414. The client 420 decodes the VoIP packets to produce an audio signal that can be heard by the user 414 using the handset 422.

Conversely, when the second user 414 talks into handset 422, the client 420 executed on user terminal 416 encodes the audio signals into VoIP packets and transmits them across the network 406 to the TV 404. The VoIP packets are received at the client engine 114 and passed to the voice engine 116. The voice engine 116 decodes the VoIP packets to produce audio information. The audio information is passed to the TV UI 118.

In one embodiment, the audio information is passed from the TV UI 118 to the amplifier 110, such that the voice from the second user 414 is heard from the TV speakers 112. If the TV 100 is currently being used to watch a TV programme, then the audio from the TV programme can be deactivated. Alternatively, the audio from the call can be mixed with the TV programme audio, which can be decreased in volume.

In an alternative embodiment, if the remote control unit 200 comprises the optional speaker circuitry 210, as described above with reference to FIG. 2, the audio information from the TV UI 118 can be passed to the Bluetooth transceiver 126 and transmitted to the remote control unit 200. At the remote control unit 200, it is received by the Bluetooth transceiver 206, and interpreted by the CPU 202 and converted to audible signals by the speaker circuitry 210. The user can then hear the voice of the second user 414 from the speaker (304 in FIG. 3) in the remote control unit 200. Concurrently with this, the TV UI 118 can control the amplifier 110 to deactivate or decrease the volume of the audio signals of a TV programme that may be being viewed at the same time. Having a speaker located in the remote control unit 200 is advantageous because it enables the user to operate the remote control unit 200 in a manner similar to a traditional telephone handset, which is familiar to the user. In addition, it enables the user to move around while communicating (within the confines of the Bluetooth transceiver range) in a similar manner to a cordless telephone. However, the presence of the speaker circuitry 210 in the remote control unit 200 does give rise to higher power consumption at the remote.

The VoIP packets for calls between users (such as 402 and 414) as described above are passed across the network 406 only, and the public switched telephone network ("PSTN") (424) is not involved. Furthermore, in the preferred embodiment of a P2P system, the actual voice calls between users of the communication system can be made with no central servers being used. This has the advantages that the network scales easily and maintains a high voice quality, and the call can be made free to the users.

However, in addition, calls can also be made from the embedded communication client 410 using the packet-based communication system to fixed-line or mobile telephones (e.g. 426), by routing the call to the PSTN network 424. These telephones can also be shown as contacts in the contact grid.

In addition to making voice calls, the user 402 of the client 410 can also communicate with the users listed in the contact grid in several other ways. For example, an instant message (also known as a chat message) can be sent to a contact. As with voice calls, the remote control unit 200 can be used for instant messaging. Text data can be input using the number keys 306, which are also used to enter alphabetic characters. The text data is transmitted to the TV 100 using the IR transmitter 204, as this is more power-efficient than Bluetooth and does not require a high data rate.

The TV UI 118 has a "chat entry state" in which key presses from the remote control unit (received at the IR receiver 124) are interpreted as alphanumeric characters that are passed to the client engine 114. The chat entry state can be entered when the user 402 selects a contact in the contact grid and selects a "chat" option displayed in the UI. The chat message data is encoded and sent from the client engine 114 over the network 406 to the communication client 420 of, for example, the second user 414. The message is displayed to the second user 414 on the user terminal 416. The second user 414 can respond by entering his own chat message, which is sent by the client 420 and received at the client engine 114. The client engine passes the message to the TV UI 118, which displays the message to the user 402 on the screen 102.

The above-described system therefore provides a method of displaying a user interface to a user on a TV screen which enables the information to be clearly viewed, even on low resolution TVs or when the user is sitting a long way from the screen. In particular, contact information can be displayed as a grid, which enables the user to view a large number of contacts, without the use of excessively small images or text. Because the user can select a subset of the contacts displayed in the grid, he can "zoom in" on a group of contacts, such that a smaller number are displayed, but the contacts displayed are consequently larger are more visible. The user can therefore, "drill down" in the contact grid, to get increasingly more visible views of the contacts. In addition, more information on each of the contacts can be displayed as the size of the contact displayed is increased.

While this invention has been particularly shown and described with reference to preferred embodiments, it will be understood to those skilled in the art that various changes in form and detail may be made without departing from the scope of the invention as defined by the appendant claims. In particular, whilst the embodiments described above have been described with reference to a TV with an embedded communication client, it should be understood that the client can also be embedded into another type of media device for connection to a TV, such a set top box, a games console or video playback device (e.g. a video disc player or a personal video recorder). Furthermore, whilst the invention has been described in the context of a P2P communication system, it will be understood that the invention can be used in combination with other, non-P2P, packet-based communication systems.

According to the invention in certain embodiments there is provided a media appliance as described above having the following features.

The display means may be a television set.

The communication client application may be programmed to allow the user to establish calls via a peer-to-peer connection in the packet based communication network.

The media appliance may comprise one of television set, a set-top box arranged to connect to a television set, a video disc player arranged to connect to a television set, a personal video recorder arranged to connect to a television set, and a games console arranged to connect to a television set.

The communication client may be further arranged to highlight the subset on the display means.

The communication client may be arranged to highlight the subset by displaying a movable selection box on the first contact grid.

The communication client may be further arranged to receive commands from the user of the communication client to move the movable selection box in two-dimensions on the first contact grid.

The graphical representations may comprise information regarding the respective contact comprising at least one of a user identity, a picture for representing the respective contact, presence information, and text data defined by the respective contact.

The communication client may be further arranged to determine whether additional information regarding the respective contact is able to be displayed in the graphical representations upon resizing the graphical representations so as to fit in the entries of the second contact grid.

The communication client may be further arranged to determine whether the number of contacts in the plurality of contacts is smaller than the number of entries in the first contact grid prior to generating the first contact grid, and, if so, reduce the dimensions of the first contact grid to the smallest extent such that the number of entries in the first contact list remains greater than or equal to the number of contacts.

The communication client may be further arranged to determine whether the number of contacts in the plurality of contacts is larger than a predetermined maximum number of entries in the first contact grid prior to generating the first contact grid, and, if so, select a group of contacts from the plurality of contacts to be displayed in the first contact grid, wherein the number of contacts in the group of contact equals the predetermined maximum.

The communication client may be further arranged to receive a command from the user to scroll the display of the first contact grid, such that the contacts in the plurality of contacts not in the group of contacts are displayed in the grid.

The communication client may be further arranged to receive alphanumeric data from the user and filter the displayed graphical representations to display only the graphical representations of contacts matching the alphanumeric data.

The communication client may be further arranged to receive a command to from the user to revert to the display of the first contact grid.

The communication client may be further arranged to receive a further selection of a subset of the graphical representations in the second contact grid from a user of the communication client, generate a third contact grid comprising a third arrangement of entries corresponding to the selected subset, and output display signals to display the third contact grid on the display means in replacement of the second contact grid, such that each of a plurality of the entries comprises a graphical representation of a respective one of the plurality of contacts, and wherein the graphical representations are resized so as to fit in the entries of the third contact grid.

The communication event may be one of a voice call, video call and instant message conversation.

The invention claimed is:

1. A method of initiating a communication event via a packet-based communication network in a media appliance having a processor executing a communication client, comprising:
  retrieving a stored list comprising a plurality of contacts associated with a user of the communication client;
  generating a first two-dimensional contact grid comprising a first arrangement of entries;
  displaying the first contact grid on a display means such that each of a plurality of the entries comprises a graphical representation of a respective one of the plurality of contacts, wherein the graphical representations are of equal size and are sized so as to fit in the entries of the first contact grid;
  receiving a selection of a subset of the graphical representations in the first contact grid from a user of the communication client, the subset being two or more of the graphical representations in the first contact grid, the subset being highlighted by a movable selection box which shows which graphical representations will be displayed on a next zoom level;
  generating a second contact grid comprising a second arrangement of entries corresponding to the selected subset;
  displaying the second contact grid on the display means in replacement of the first contact grid, such that each of a plurality of the entries comprises a graphical representation of a respective one of the plurality of contacts, and wherein the graphical representations are of equal size and are resized so as to fit in the entries of the second contact grid;
  receiving a selection of one of the graphical representations in the second contact grid from the user of the communication client; and
  initiating a communication event with the contact represented by the selected graphical representation via the packet-based communication network.

2. A method according to claim 1, further comprising receiving commands to move the movable selection box in two-dimensions on the first contact grid from the user of the communication client.

3. A method according to claim 1, wherein the graphical representations comprise information regarding the respective contact comprising at least one of a user identity, a picture for representing the respective contact, presence information, and text data defined by the respective contact.

4. A method according to claim 3, further comprising upon resizing the graphical representations so as to fit in the entries of the second contact grid, determining whether additional information regarding the respective contact is able to be displayed in the graphical representations.

5. A method according to claim 1, further comprising prior to generating the first contact grid, determining whether the number of contacts in the plurality of contacts is smaller than the number of entries in the first contact grid, and if so, reducing the dimensions of the first contact grid to the smallest extent such that the number of entries in the first contact grid remains greater than or equal to the number of contacts.

6. A method according to claim 1, further comprising prior to generating the first contact grid, determining whether the number of contacts in the plurality of contacts is larger than a predetermined maximum number of entries in the first contact grid, and if so, selecting a group of contacts from the plurality of contacts to be displayed in the first contact grid, wherein the number of contacts in the group of contact equals the predetermined maximum.

7. A method according to claim 6, further comprising receiving a command from the user to scroll the display of the first contact grid, such that the contacts in the plurality of contacts not in the group of contacts are displayed in the grid.

8. A method according to claim 1, further comprising receiving alphanumeric data from the user and filtering the displayed graphical representations to display only the graphical representations of contacts matching the alphanumeric data.

9. A method according to claim 1, further comprising receiving a command from the user to revert to the display of the first contact grid.

10. A method according to claim 1, further comprising:
  receiving a further selection of a subset of the graphical representations in the second contact grid from a user of the communication client;
  generating a third contact grid comprising a third arrangement of entries corresponding to the selected subset; and
  displaying the third contact grid on the display means in replacement of the second contact grid, such that each of a plurality of the entries comprises a graphical representation of a respective one of the plurality of contacts, and wherein the graphical representations are resized so as to fit in the entries of the third contact grid.

11. A method according claim 1, wherein the communication event is one of a voice call, video call and instant message conversation.

12. A method according to claim 1, wherein the communication event is established via a peer-to-peer connection in the packet based communication network 13. A method according to claim 1, wherein the display means is a television set.

14. A method according to claim 1, wherein the media appliance comprises one of television set, a set-top box arranged to connect to a television set, a video disc player arranged to connect to a television set, a personal video recorder arranged to connect to a television set, and a games console arranged to connect to a television set.

15. A computer program product, embodied on a computer-readable storage memory, comprising program code which, when executed by a computer implement a method comprising:

retrieving a stored list comprising a plurality of contacts associated with a user of a communication client;

generating a first two-dimensional contact grid comprising a first arrangement of entries;

displaying the first contact grid on a display means such that each of a plurality of the entries comprises a graphical representation of a respective one of the plurality of contacts, wherein the graphical representations are sized so as to fit in the entries of the first contact grid;

receiving a selection of a subset of the graphical representations in the first contact grid from a user of the communication client, the subset being two or more of the graphical representations in the first contact grid, the subset being highlighted by a movable selection box which shows which graphical representations will be displayed on a next zoom level;

generating a second contact grid comprising a second arrangement of entries corresponding to the selected subset;

displaying the second contact grid on the display means in replacement of the first contact grid, such that each of a plurality of the entries comprises a graphical representation of a respective one of the plurality of contacts, and wherein the graphical representations are resized so as to fit in the entries of the second contact grid;

receiving a selection of one of the graphical representations in the second contact grid from the user of the communication client; and initiating a communication event with the contact represented by the selected graphical representation via the packet-based communication network.

16. A media appliance, comprising:

a memory storing a communication client application;

a processor, coupled to the memory and operable to execute the communication client application, wherein the client application is programmed so as when executed to allow a user to establish a call with one or more other users via a packet-based communication network and output display signals to generate a user interface for display on a display means, wherein the media appliance is arranged to retrieve a stored list comprising a plurality of contacts associated with the user of the communication client, generate a first two-dimensional contact grid comprising a first arrangement of entries, output display signals to display the first contact grid on the user interface such that each of a plurality of the entries comprises a graphical representation of a respective one of the plurality of contacts, wherein the graphical representations are sized so as to fit in the entries of the first contact grid, receive a selection of a subset of the graphical representations in the first contact grid from a user of the communication client, the subset being two or more of the graphical representations in the first contact grid, the subset being highlighted by a movable selection box which shows which graphical representations will be displayed on a next zoom level, generate a second contact grid comprising a second arrangement of entries corresponding to the selected subset, output display signals to display the second contact grid on the display means in replacement of the first contact grid, such that each of a plurality of the entries comprises a graphical representation of a respective one of the plurality of contacts, and wherein the graphical representations are resized so as to fit in the entries of the second contact grid, receive a selection of one of the graphical representations in the second contact grid from the user of the communication client, and initiate a communication event with the contact represented by the selected graphical representation via the packet-based communication network.

17. A media appliance according to claim 16, further comprising a remote control unit comprising at least one wireless communication means arranged to transmit data to the processor, a control means coupled to the wireless communication means and configured to control the wireless communication means, and user input means coupled to the control means and arranged to receive input commands from the user and provide the input commands to the control means.

18. A media appliance according to claim 17, wherein the selection of a subset of the graphical representations in the first contact grid and the selection of one of the graphical representations in the second contact grid are received at the control means from the user input means, and transmitted to the communication client using the at least one wireless communication means.

19. A media appliance according to claim 17, wherein the at least one wireless communication means comprises at least one of a radio transmitter and an infra-red transmitter.

20. A media appliance according to claim 16, wherein the communication client application is arranged to decode audio and video packets received at the processor over the packet-based communication network as audio and video data.

21. A media appliance according to claim 16, wherein the communication client application is arranged to encode audio and video signals received at the processor as voice over internet protocol packets and video packets for transmission over the packet-based communication network.

22. A method of initiating a communication event via a packet-based communication network in a media appliance having a processor executing a communication client, comprising:

retrieving a stored list comprising a plurality of contacts associated with a user of the communication client;

generating a first two-dimensional contact grid comprising a first arrangement of entries;

displaying the first contact grid on a display means such that each of a plurality of the entries comprises a graphical representation of a respective one of the plurality of contacts, wherein the graphical representations are sized so as to fit in the entries of the first contact grid;

receiving a selection of a subset of the graphical representations in the first contact grid from a user of the communication client, the subset being two or more of the graphical representations in the first contact grid, the subset being highlighted by a movable selection box which shows which graphical representations will be displayed on a next zoom level;

generating a second contact grid comprising a second arrangement of entries corresponding to the selected subset;

displaying the second contact grid on the display means in replacement of the first contact grid, such that each of a plurality of the entries comprises a graphical representation of a respective one of the plurality of contacts, and wherein the graphical representations are resized so as to fit in the entries of the second contact grid;

receiving a selection of one of the graphical representations in the second contact grid from the user of the communication client; and initiating a communication event with the contact represented by the selected graphical representation via the packet-based communication network, wherein the communication event is one of a voice call, video call and instant message conversation.

* * * * *

UNITED STATES PATENT AND TRADEMARK OFFICE
CERTIFICATE OF CORRECTION

| | | |
|---|---|---|
| PATENT NO. | : 8,489,691 B2 | Page 1 of 1 |
| APPLICATION NO. | : 12/455653 | |
| DATED | : July 16, 2013 | |
| INVENTOR(S) | : Blackburn et al. | |

It is certified that error appears in the above-identified patent and that said Letters Patent is hereby corrected as shown below:

In the Claims

In column 18, line 62, in Claim 12, after "network" insert -- . --.

Signed and Sealed this
Third Day of February, 2015

Michelle K. Lee
*Deputy Director of the United States Patent and Trademark Office*